(12) United States Patent
Kogetsu et al.

(10) Patent No.: US 7,851,089 B2
(45) Date of Patent: Dec. 14, 2010

(54) ELECTRODE PLATE FOR BATTERY AND LITHIUM SECONDARY BATTERY INCLUDING THE SAME

(75) Inventors: Yasutaka Kogetsu, Osaka (JP); Kazuyoshi Honda, Osaka (JP)

(73) Assignee: Panasonic Corporation, Osaka (JP)

( * ) Notice: Subject to any disclaimer, the term of this patent is extended or adjusted under 35 U.S.C. 154(b) by 570 days.

(21) Appl. No.: 11/877,425

(22) Filed: Oct. 23, 2007

(65) Prior Publication Data

US 2008/0102359 A1 May 1, 2008

(30) Foreign Application Priority Data

Oct. 26, 2006 (JP) ............... 2006-291314

(51) Int. Cl.
*H01M 4/66* (2006.01)
*H01M 4/70* (2006.01)

(52) U.S. Cl. ................ 429/238; 429/245
(58) Field of Classification Search ......... 429/237, 429/238, 245
See application file for complete search history.

(56) References Cited

U.S. PATENT DOCUMENTS

| 5,294,504 | A | * | 3/1994 | Otagawa et al. | 429/237 X |
| 5,436,091 | A | * | 7/1995 | Shackle et al. | 429/245 X |
| 7,153,611 | B2 | * | 12/2006 | Minami et al. | 429/245 X |
| 2005/0064291 | A1 | * | 3/2005 | Sato et al. | 429/245 X |
| 2006/0110662 | A1 | | 5/2006 | Konishiike | |

FOREIGN PATENT DOCUMENTS

| JP | 2005-196970 | 7/2005 |
| JP | 2005-209533 | 8/2005 |
| KR | 2006-058761 | 5/2006 |
| WO | 0129912 | 4/2001 |

OTHER PUBLICATIONS

Korean Office Action dated Apr. 29, 2010.

* cited by examiner

*Primary Examiner*—Stephen J. Kalafut
(74) *Attorney, Agent, or Firm*—Dickinson Wright PLLC

(57) ABSTRACT

An electrode plate for a battery includes a current collector having a substrate and a plurality of protrusions that are carried on the substrate; and an active material layer that is carried on the current collector. The protrusions include a conductive material that undergoes plastic deformation more easily than the substrate. A lithium secondary battery includes the above electrode plate.

9 Claims, 10 Drawing Sheets

US 7,851,089 B2

ELECTRODE PLATE FOR BATTERY AND LITHIUM SECONDARY BATTERY INCLUDING THE SAME

FIELD OF THE INVENTION

The present invention relates to an improved electrode plate for a battery, and more particularly to a lithium secondary battery including the electrode plate.

BACKGROUND OF THE INVENTION

With the development of portable devices such as personal computers and cell phones in recent years, demand is increasing for batteries for use as a power source for the devices. The batteries for such an application are required to operate at room temperature as well as to have a high energy density and excellent cycle characteristics.

To satisfy the above demand, batteries including, as a negative electrode active material, a material containing silicon (Si) or tin (Sn), which can provide a very high capacity, are regarded as promising. Examples of the material containing Si or Sn include a simple substance of Si or Sn, an oxide of Si or Sn, and an alloy containing Si or Sn.

However, the materials listed above undergo a change in crystal structure upon absorption of lithium, so their volumes increase significantly. In other words, the materials listed above undergo a significant change in volume during charge and discharge. For this reason, repetition of charge and discharge causes a contact failure between the active material and the current collector, resulting in a short charge/discharge cycle life.

In order to solve this problem, for example, WO 01/029912 proposes to form a silicon thin film on a current collector having a roughened surface.

However, according to the technique disclosed in WO 01/029912, there is not a space inside the Si thin film, and the current collector is made of a copper foil of a single composition. Thus, a large stress, which is generated during the expansion of the active material, is transmitted to the current collector, causing the Si thin film to detach from the interface between the Si thin film and the current collector, or causing the electrode plate to deform.

BRIEF SUMMARY OF THE INVENTION

An electrode plate for a battery according to the present invention includes a current collector having a substrate and a plurality of protrusions that are carried on the substrate; and an active material layer that is carried on the current collector. The protrusions are formed of a conductive material that undergoes plastic deformation more easily than the substrate. The bottoms of the protrusions are bonded to the substrate.

It is preferable that the protrusions have a thickness of 1 to 15 μm. It is preferable that the protrusions contain copper having a purity of not less than 99.9 wt %. It is preferable that the protrusions are formed by a plating method, vapor deposition method, sputtering method or sintering method.

It is preferable that the substrate is at least one selected from the group consisting of a nickel foil, a stainless steel foil, and a copper foil. It is preferable that a copper foil used as the substrate includes at least one element selected from the group consisting of Ni, Si, Sn, Be, Co, Ti, Fe and Zr.

It is preferable that the active material layer includes a plurality of columnar particles, and the columnar particles are carried on the protrusions.

It is preferable that at least part of the columnar particles is inclined with respect to a normal line direction of the surface of the current collector. Although the surface of the current collector has protrusions, when observed visually, the surface of the current collector appears to be flat, so the normal line direction of the current collector can be determined uniquely.

It is preferable that the columnar particles each are made up of a laminate of a plurality of sub-particle layers (grain layers), and the plurality of sub-particle layers are inclined with respect to the normal line direction of the surface of the current collector. It is more preferable that the growth directions of the plurality of sub-particle layers are inclined alternately in a first direction and a second direction with respect to the normal line direction of the surface of the current collector.

The present invention further relates to a lithium secondary battery including a positive electrode capable of absorbing and desorbing lithium ions, the above-described electrode plate serving as a negative electrode, a separator that is disposed between the positive electrode and the negative electrode, and an electrolyte having lithium ion conductivity.

DETAILED DESCRIPTION OF THE INVENTION

Figure 1:
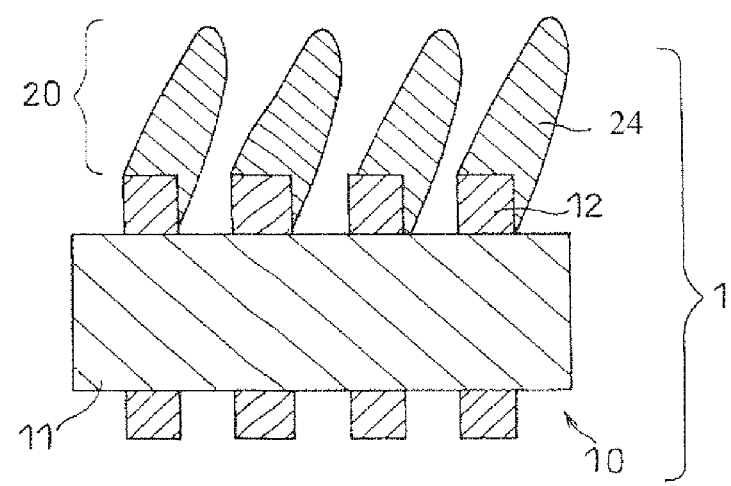
FIG. 1 is a vertical cross-sectional view schematically showing an electrode plate according to an embodiment of the present invention.
Figure 2:
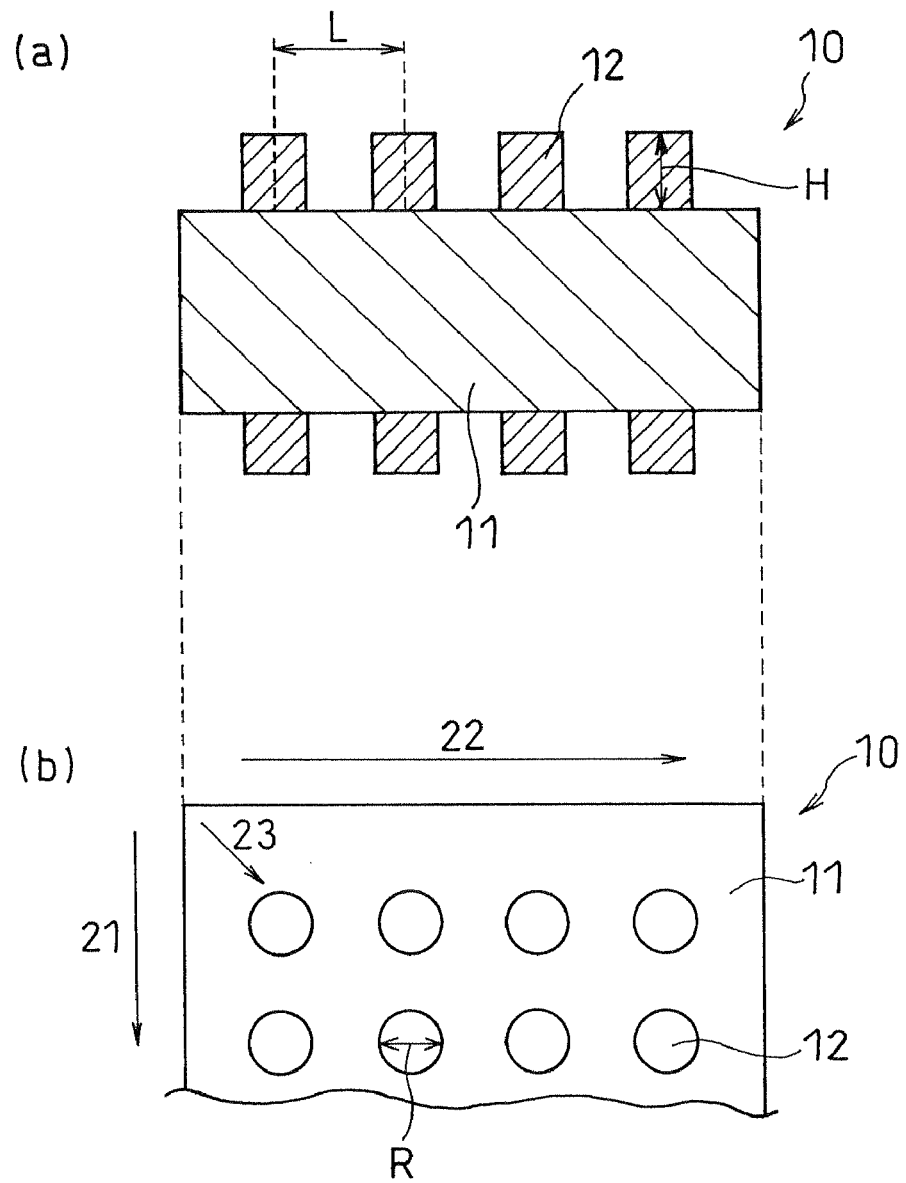
FIG. 2 is a vertical cross-sectional view schematically showing an example of a current collector having protrusions formed on its surface.

FIG. 1 schematically shows an electrode plate 1 according to an embodiment of the present invention. FIG. 2 schematically shows a current collector 10 included in the electrode plate 1.

The electrode plate 1 for a battery of the present invention includes a current collector 10 having a substrate 11 and a plurality of protrusions 12 that are carried directly on the substrate, and an active material layer 20 that is carried on the current collector. The protrusions 12 include a conductive material that undergoes plastic deformation more easily than the substrate 11. In other words, the protrusions 12 are made up of a conductive material that follows the expansion of the active material layer more easily than the substrate 11.

The expansion and contraction of the active material generates a large stress at the interface between the active material and the current collector. The current collector includes protrusions that undergo plastic deformation more easily than the substrate, whereby the stress that is generated by the expansion and contraction of the active material is absorbed by the protrusions without being concentrated on the interface between the current collector and the active material. In this situation, the plastic deformation amount of the protrusions is only about 1%, but the protrusions can disperse the stress generated at the interface between the active material and the current collector. This suppresses the deformation of the electrode plate as well as the detachment of the active material from the current collector.

Further, because the protrusions easily undergo plastic deformation when the active material expands during the initial charge, the protrusion can follow the expansion of the active material, so the stress is unlikely to be transmitted to the substrate. Also, it is more difficult for the substrate to undergo plastic deformation than the protrusions. Accordingly, it is also possible to prevent the occurrence of creases in the electrode plate.

As described above, with the inclusion of a substrate and protrusions containing a conductive material that undergoes plastic deformation more easily than the substrate in a current collector, it is possible to improve cycle characteristics of the battery.

The expansion stress of the active material reaches the maximum during the initial charge. After having undergone plastic deformation during the initial charge, the protrusions are considered to hardly undergo further deformation even when the active material repeats expansion and contraction. This is presumably because diffusion paths for lithium are insured during the initial charge, and at the same time, the elemental arrangement of the active material is optimized, whereby the stress generated by the expansion and contraction of the active material is reduced.

It is preferable that at least surface portions of the protrusions 12 easily undergo plastic deformation so that the protrusions can follow the expansion of the active material layer.

The ease of following the expansion of the active material layer 20 of the protrusions 12 can be expressed by the hardness of the protrusions 12. For example, the hardness of the protrusions 12 can be measured by Vickers hardness measurement. The protrusions 12 preferably have a Vickers hardness of not greater than 100, and more preferably not greater than 90. The Vickers hardness can be measured according to Japanese Industrial Standard Z2244.

Even if the protrusions have an initial Vickers hardness (the Vickers hardness of the protrusions immediately after production) of not less than 130, when the annealing temperature for the protrusions is lower than that for the substrate, by subjecting the current collector to a heat treatment with a temperature at which the protrusions are annealed, the Vickers hardness of the protrusions can be reduced to, for example, not greater than 100.

The active material layer 20 that is carried on the current collector preferably includes a plurality of columnar particles 24, and the columnar particles 24 preferably are carried by the protrusions 12.

By allowing the protrusions 12 to carry the columnar particles 24, interstices can be formed in the active material layer 20. In other words, the porosity of the active material layer 20 can be increased. Consequently, the expansion of the columnar particles 24 can be relieved, and thus it is possible to further suppress the detachment of the columnar particles 24 from the current collector 10 and the deformation of the electrode plate.

The columnar particles 24 preferably contain a silicon-containing material because the silicon-containing material can provide a high capacity. Such a material undergoes a large volume change during charge and discharge, but by using a current collector 10 as described above, even when a silicon-containing material is used, the deformation of the electrode plate, the detachment of the active material from the current collector, and the like can be suppressed sufficiently.

As the silicon-containing material, for example, a silicon simple substance, a silicon oxide ($SiO_x$), a silicon alloy and a silicon compound can be used.

As the silicon alloy, for example, a Si—Ti based alloy and a Si—Cu based alloy can be used.

As the silicon compound, for example, a silicon nitride ($SiN_x$) can be used.

The active material layer 20 preferably has a porosity of 10 to 70%, and more preferably 30 to 60%. When the active material layer 20 has a porosity of 10% or greater, the effect of relieving the expansion of the active material layer 20 is obtained. When the porosity exceeds 70%, the resulting electrode plate can be used without any problems depending on the application of the battery, but the energy density of the electrode plate will be small.

The porosity of the active material layer 20 can be calculated from the weight and thickness of a defined area of the active material layer, and the density of the active material. The porosity (%) can be determined by the expression: $100[\{ST-(W/D)\}/ST]$, where T is the thickness of a defined area S of an active material layer, W is the weight of the active material layer, and D is the active material density.

The porosity of the active material layer 20 can be controlled by adjusting, for example, the height of the protrusions, the size of the protrusions, the spacing between the protrusions, or the like. When the growth direction of the columnar active material particles is inclined with respect to the normal line direction of the surface of the current collector, by further adjusting the angle between the growth direction of the columnar particles and the normal line direction of the surface of the current collector, the porosity of the negative electrode active material layer can be controlled.

The height H of the protrusions preferably is 1 to 15 μm, and more preferably 3 to 10 μm. When the height H of the protrusions is less than 1 μm, the stress absorption capability of the protrusions will be insufficient, and interstices may not be formed sufficiently in the active material layer. As a result, the active material may be detached from the current collector, or the electrode plate may be deformed, deteriorating the cycle characteristics of the battery. When the height H of the protrusions is greater than 15 μm, the total thickness of the electrode plate will be large, which may reduce the capacity density of the battery.

As used herein, "the height H of the protrusions" refers to the distance between the highest position of the protrusions 12 and the interface between the substrate 11 and the protrusions 12. The height H of the protrusions is an average value obtained by cutting the current collector, observing the cut surface using an electron microscope, measuring the height of 2 to 10 protrusions, and averaging the obtained values.

The size R of the protrusions preferably is 1 to 20 μm, and more preferably 3 to 15 μm. When the size R of the protrusions is greater than 20 μm, the columnar active material particles formed on the protrusions will inevitably have a size greater than 20 μm. Large active material particles having the above size produce an extremely large expansion stress, so the active material particles may undergo self-destruction. As a result, the active material may be detached from the current collector, which may deteriorate the cycle characteristics of the battery. When the size R of the protrusions is less than 1 μm, similarly to the above, the stress absorption capability of the protrusions will be insufficient, and interstices may not be formed sufficiently in the active material layer.

As used herein, "the size R of the protrusions" refers to the maximum diameter of the protrusions when viewed from the normal line direction of the surface of the current collector. The size R of the protrusions can be determined by measuring the maximum diameter of 2 to 10 protrusions from the normal line direction of the surface of the current collector with an electron microscope, and averaging the obtained values.

It is preferable that the spacing L between two adjacent protrusions is 1 to 30 μm, and more preferably 15 to 30 μm. When the spacing L between adjacent protrusions is less than 1 μm, the adjacent columnar particles are combined, which may reduce the porosity of the active material layer. If the porosity of the active material layer is reduced, the effect of relieving the expansion stress of the active material may not be obtained sufficiently. When the spacing L between adjacent protrusions is greater than 30 μm, columnar particles may be formed in other regions besides on the protrusions, and thus the expansion stress of the active material may cause the substrate to deform largely.

As used herein, "the spacing L of adjacent protrusions" refers to the distance between the center axes of the protrusions. The center axis refers to the axis that extends through the center of the shape of a protrusion when viewed from the normal line direction of the surface of the current collector and is parallel to the normal line direction of the surface of the current collector. The spacing between adjacent protrusions is an average value obtained by cutting the current collector, observing the cut surface with an electron microscope, measuring the spacing between adjacent protrusions for 2 to 10 pairs of protrusions, and averaging the obtained values.

It is preferable that the spacing between two protrusions that are adjacent at the shortest distance is 1 to 30 μm, and more preferably 15 to 30 μm. For example, when the spacing between two adjacent protrusions is the shortest in the direction parallel to arrow 21 in FIG. 2, the spacing between the two adjacent protrusions preferably is within the above range. In this case, the distance between two adjacent protrusions, for example, in the direction parallel to arrow 22 and/or the direction parallel to arrow 23, also may be within the above range.

The shape of the protrusions when viewed from the normal line direction of the current collector may be a circle as shown in FIG. 2, or an ellipse or rhombus. In the case of an ellipse or rhombus, the point of intersection between the major axis and the minor axis is the center, and the center axis is the axis that extends through the center and is vertical to the normal line direction of the surface of the current collector.

Similar to the case of the protrusions before annealing, the protrusions after annealing preferably have a height, a size and a spacing between two adjacent protrusions that fall within the above-described ranges, respectively.

It is preferable that the protrusions 12 contain copper having a purity of not less than 99.9 wt %. As the copper having a purity of not less than 99.9%, for example, tough pitch copper may be used. Tough pitch copper refers to a copper material containing not less than 99.9 wt % of copper and 0.02 to 0.05 wt % of oxygen.

With protrusions formed of such copper having a purity of not less than 99.9 wt %, the expansion stress of the active material layer can be absorbed sufficiently.

The substrate 11 preferably has a Vickers hardness of not less than 140, and more preferably not less than 200.

As the substrate 11 described above, for example, a nickel foil, stainless steel foil or copper alloy foil can be used. The copper foil preferably contains at least one element selected from the group consisting of Ni, Si, Sn, Be, Co, Ti, Fe and Zr. For example, when the copper alloy foil contains at least one element selected from the group consisting of Ni, Si, Sn, Be, Co, Ti, and Fe, the copper alloy foil preferably contains the at least one element in an amount of 0.1 to 1 wt %, and more preferably in an amount of 0.2 to 3 wt %.

Depending on the type of the metal element added to the copper alloy, even when the amount of the metal element is very small, in other words, even when the copper concentration is 99.9 wt % or more, a Vickers hardness of not less than 140 can be obtained. For example, the addition of Zr in an amount of 0.015 to 0.03 wt % yields a copper alloy having a high annealing temperature, that is, a copper alloy having a high hardness. Copper alloys containing the above-listed metal elements cannot be formed if the metal elements are not intentionally added to copper. In other words, if the metal elements are not added intentionally in the methods for forming the protrusions described below, the metal elements will not be included in the protrusions.

Using a substrate made of such a material, it is possible to suppress the deformation of the electrode plate caused by the stress generated when the active material layer expands.

The protrusions 12 and the substrate 11 preferably have Vickers hardnesses within the above-described ranges, respectively, and at the same time, the difference between the Vickers hardness of the protrusions and the Vickers hardness of the substrate preferably is not less than 50, and more preferably not less than 70. This allows the protrusions to absorb the expansion stress of the active material layer, and at the same time, prevents the substrate from being deformed even if the stress is transmitted to the substrate. When protrusions are annealed, as long as the difference between the Vickers hardness of the annealed protrusions and that of the substrate is not less than 50, the difference between the Vickers hardness of the protrusions immediately after production and that of the substrate may be less than 50.

It is preferable that the protrusions 12 are formed by a plating method, vapor deposition method, sputtering method or sintering method in which the component material of the protrusions and the substrate are sintered. The protrusions produced by the above production methods do not require a machining process. Accordingly, the protrusions, as well as their surface portions, can be kept in a state of being easily plastically deformed.

With the above-listed production methods, protrusions formed of copper having a purity of, for example, not less than 99.9 wt % can be formed.

In contrast, according to a conventionally used method involving a machining process, the top faces of the protrusions are compressed. More specifically, for example, according to a method for forming irregularities on the surface of a current collector in which the current collector is sandwiched by two rollers having recessed portions arranged in a predetermined pattern on the surfaces thereof, the top faces of the protrusions are compressed by the rollers, and thus the protrusions hardly undergo deformation.

The following describes the methods for forming the protrusions in further detail.

(i) The formation of the protrusions using a plating method or vapor deposition method (or a sputtering method) can be performed in the following manner, for example.

First, a resist layer having openings arranged in a predetermined pattern is formed on the substrate by a photoresist method.

More specifically, the resist layer is formed by applying a resist onto the substrate. Subsequently, using a glass mask or resin mask in which a predetermined pattern (e.g., 1 to 20 μm-sized circular or polygonal dots) is printed, the resist layer is exposed to light, then developed with an aqueous alkaline solution, followed by washing with water and drying. Thus, a resist layer having openings arranged in a predetermined pattern can be obtained.

As the resist, a liquid resist or a dry film resist can be used. The resist may be a negative type or positive type resist. The resist layer preferably has a thickness three times greater than the height of the protrusions.

Then, protrusions are formed by a plating method.

The substrate having the developed resist layer is immersed in an electrolyte containing a component material (metal ions) for protrusions so as to plate the openings of the resist layer with the metal, whereby protrusions can be formed. With the plating method, for example, protrusions formed of copper having a purity of not less than 99.9 wt % can be formed.

Alternatively, it is also possible to form protrusions on the substrate by a vapor deposition method or sputtering method using a component material for protrusions as a target.

More specifically, a substrate having a resist layer having openings arranged in a predetermined pattern is obtained in the manner described above. Subsequently, the component material for protrusions serving as a target is vapor-deposited or sputtered on the substrate to deposit the component material for protrusions.

As the target, it is preferable to use, for example, copper having a purity of 99.9 wt %.

(ii) The formation of the protrusions by a sintering method can be performed in the following manner, for example.

First, a slurry containing predetermined conductive material particles is prepared. The obtained slurry is applied onto the substrate. Subsequently, the slurry and the substrate are sintered at a predetermined temperature. Thus, protrusions can be formed on the substrate.

The conductive material particles preferably have a median particle size of 1 to 10 μm. When the particles have a median particle size less than 1 μm, effective protrusions may not be obtained. When the particles have a median particle size greater than 10 μm, the protrusions may not be spaced apart at an appropriate spacing. Accordingly, when the active material layer is formed, sufficient spaces may be formed in the active material layer.

The sintering temperature preferably is 500 to 700° C. For example, when copper particles are used as the conductive material particles, the copper particles can be sintered at a temperature within this temperature range.

Figure 3:
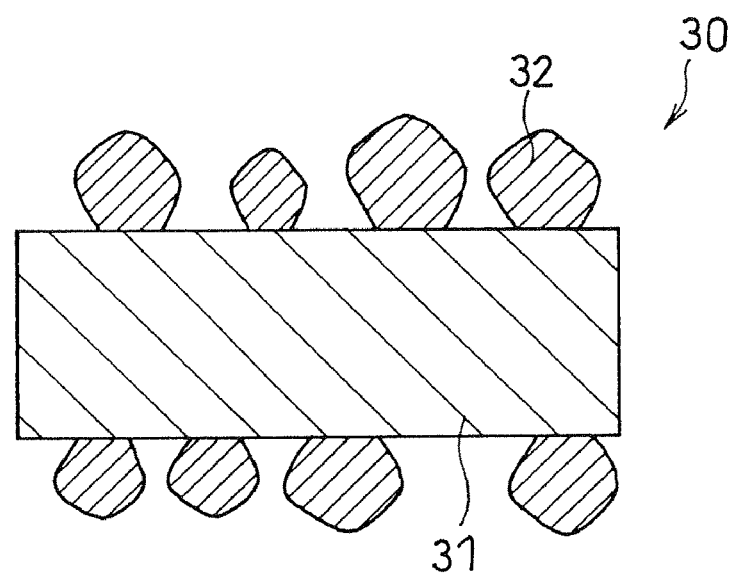
FIG. 3 is a vertical cross-sectional view schematically showing another example of a current collector having protrusions formed on its surface.

As long as the spacing L between adjacent protrusions falls within the above-described range, the protrusions may be arranged regularly as shown in FIG. 2, or irregularly as shown in FIG. 3. FIG. 3 shows a current collector 30 in which protrusions 32 are arranged irregularly on a substrate 31.

The current collector given as an example and shown in FIG. 1 in which protrusions formed of copper are arranged regularly can be produced by, for example, the above-described plating method or vapor deposition method (or a sputtering method).

First, similar to the above, a resist layer having openings arranged in a predetermined pattern is formed on the substrate by a photoresist method. In this process, for example, a glass mask or resin mask in which 1 to 20 μm-sized circular or polygonal dots are printed can be used.

Subsequently, protrusions are formed by the plating method. The substrate having the developed resist layer is immersed in a copper sulfate bath to plate the openings of the resist with copper, whereby protrusions formed of copper can be arranged regularly.

Alternatively, it is also possible to form the protrusions formed of copper on the substrate by the vapor deposition method or sputtering method.

A current collector as shown in FIG. 3 in which protrusions formed of copper are arranged irregularly can be produced by, for example, a plating method in which protrusions formed of copper are allowed to grow in the form of particles. In this plating method, by using a current density higher than that used in normal plating (e.g., a current density equal to or greater than the critical current density), metal particles having a predetermined size can be grown on the surface of the substrate.

Alternatively, using the above-described sintering method, protrusions formed of copper can be arranged irregularly on the substrate.

In the present invention, the conductive material that forms the protrusions may be a metal other than copper as long as the conductive material easily undergoes plastic deformation. Protrusions formed of a metal other than copper also can be produced basically in the same manner as described above.

Figure 5:
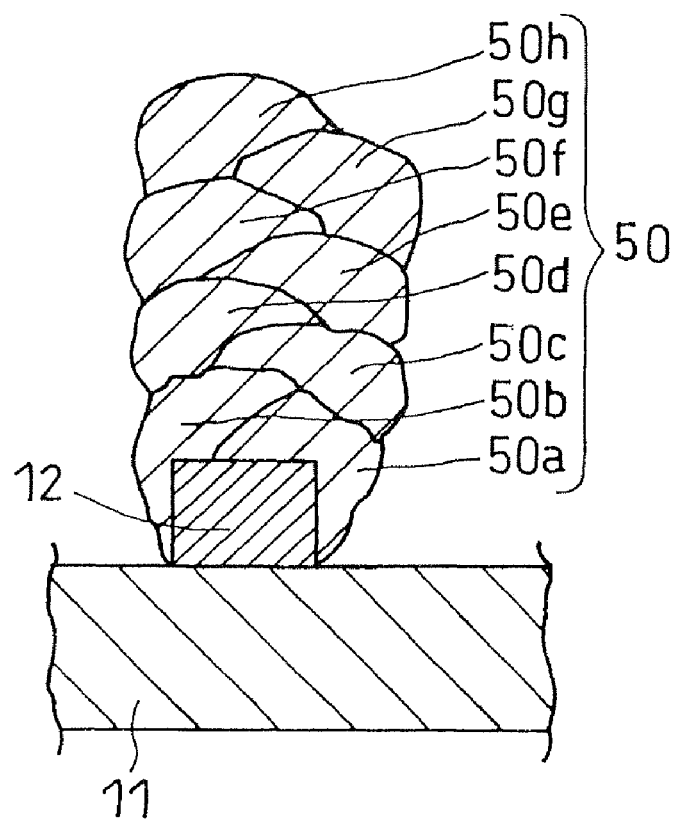
FIG. 5 is a vertical cross-sectional view schematically showing a columnar particle included in an active material layer of an electrode plate according to another embodiment of the present invention.
Figure 6:
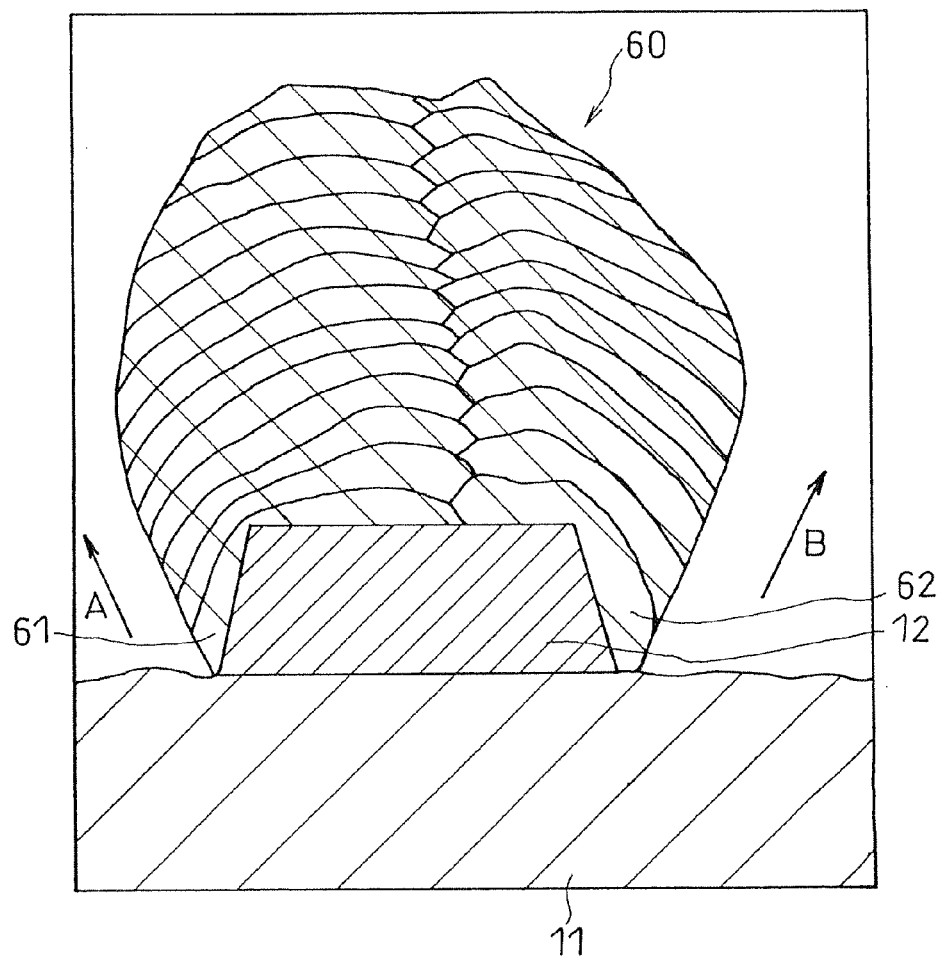
FIG. 6 is a vertical cross-sectional view schematically showing a columnar particle included in an active material layer of an electrode plate according to still another embodiment of the present invention.

The columnar particles that are carried on the surface of the current collector each may be formed of a single particle as shown in FIG. 1, or may be formed of a laminate of a plurality of sub-particle layers as shown in FIGS. 5 and 6. The growth direction of the columnar particles may be inclined relative to the normal line direction of the surface of the current collector as shown in FIG. 1. The average growth direction of the columnar particle as a whole may be parallel to the normal line direction of the surface of the current collector as shown in FIGS. 5 and 6.

FIGS. 5 and 6 schematically show active material particles included in electrode plates according to other embodiments of the present invention. In FIGS. 5 and 6, the same reference numerals are given to the same components as in FIG. 1.

Figure 4:
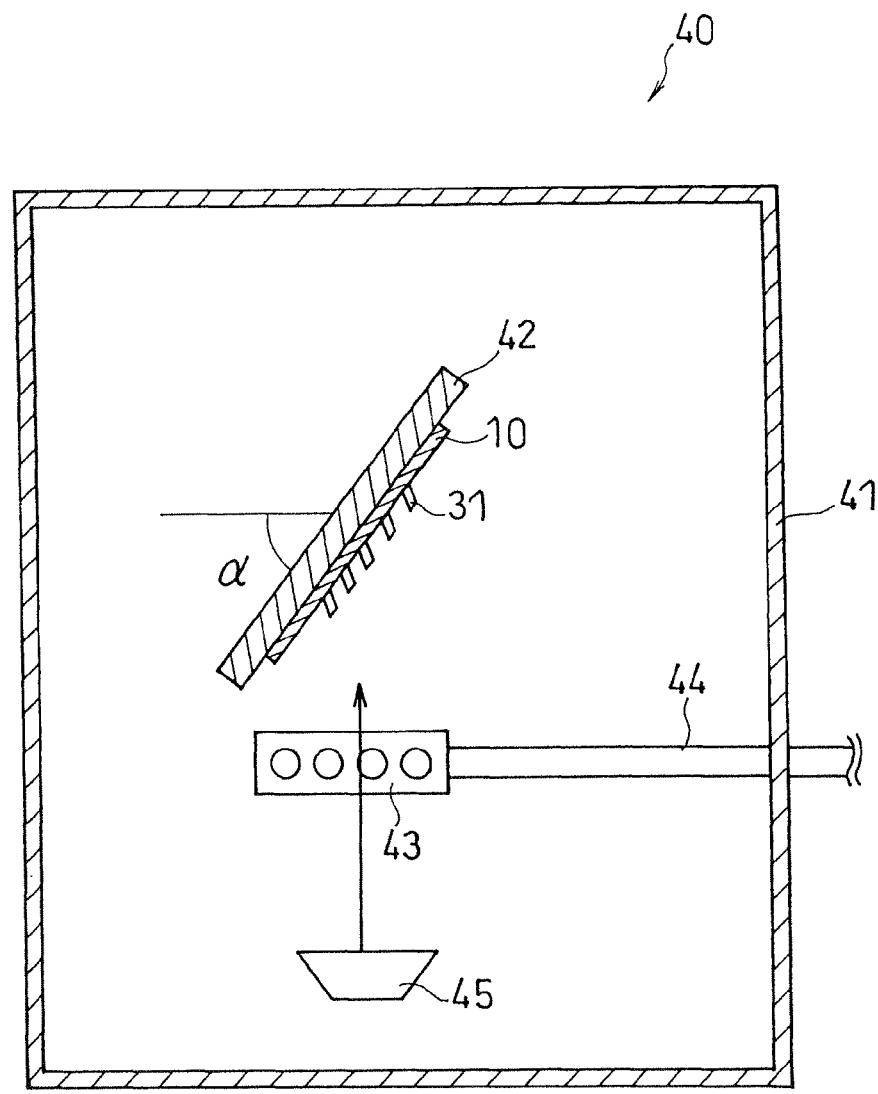
FIG. 4 is a schematic diagram showing an example of a production apparatus used to form active material layers.

An active material layer 20 of FIG. 1 can be produced by using, for example, a vapor deposition apparatus 40 including an electron beam heater (not shown) as shown in FIG. 4.

The vapor deposition apparatus 40 includes a pipe 44 for introducing an oxygen gas into a chamber 41, and nozzles 43. The nozzles 43 are connected to the pipe 44 inserted into the vacuum chamber 41. The pipe 44 is connected to an oxygen cylinder (not shown) through a mass flow controller (not shown).

A holding table 42 for fixing a current collector 10 is disposed above the nozzles 43. A target 45 is disposed vertically below the holding table 42. Between the current collector 10 and the target 45, an oxygen atmosphere made of an oxygen gas is present.

As the target 45, a silicon-containing material such as a silicon simple substance can be used.

The current collector 10 having regularly arranged protrusions as shown in FIG. 2 is fixed onto the holding table 42, and the holding table 42 is inclined to form an angle α with respect to the horizontal plane.

In the case where a silicon simple substance is used as the target 45, upon irradiation of electron beams to the target 45, silicon atoms are evaporated from the target 45. The evaporated silicon atoms pass through the oxygen atmosphere and then deposit on the current collector together with oxygen atoms. In this manner, an active material layer including a silicon oxide is formed on the current collector. In the deposition, silicon atoms together with oxygen atoms are deposited intensively onto the protrusions 12 of the current collector. Accordingly, the active material layer is formed of a plurality of columnar particles 24 containing the silicon oxide that are formed on the protrusions as shown in FIG. 1.

A columnar particle 50 of FIG. 5 has a laminate including eight sub-particle layers 50a, 50b, 50c, 50d, 50e, 50f, 50g and 50h. In the columnar particle 50 of FIG. 5, the growth direction of the sub-particle layer 50a is inclined in a predetermined first direction with respect to the normal line direction of the current collector surface. The growth direction of the sub-particle layer 50b is inclined in a second direction that is different from the first direction with respect to the normal line direction of the current collector surface. Similar to the above, the subsequent sub-particle layers included in the columnar particle 50 are inclined alternately in the first direction and the second direction with respect to the normal line direction of the current collector surface. By changing the growth directions of the sub-particle layers alternately in the first and the second direction when a plurality of sub-particle layers are laminated, the average growth direction of the columnar particle 50 as a whole can be aligned parallel to the normal line direction of the current collector surface.

Alternatively, as long as the growth direction of the columnar particle as a whole is parallel to the normal line direction of the current collector surface, the growth directions of the sub-particle layers may be inclined in different directions.

The columnar particle of FIG. 5 can be produced in the following manner, for example. First, the sub-particle layer 50a is formed so as to cover the top of a protrusion 12 and a part of the side face extending from the top. Subsequently, the sub-particle layer 50b is formed so as to cover the remaining part of the side face of the protrusion 12 and a part of the top surface of the sub-particle layer 50a. Specifically, in FIG. 5, the sub-particle layer 50a is formed on one end of the protrusion 12 including the top, and the sub-particle layer 50b is formed such that a part of the sub-particle layer 50b overlaps the sub-particle layer 50a and the remaining part is formed on the other end of the protrusion 12. Further, the sub-particle layer 50c is formed so as to cover the remaining part of the top surface of the sub-particle layer 50a and a part of the top surface of the sub-particle layer 50b. Specifically, the sub-particle layer 50c is formed so as to come into contact mainly with the sub-particle layer 50a. Further, the sub-particle layer 50d is formed so as to come into contact mainly with the sub-particle layer 50b. In the same manner as above, by alternately laminating the subsequent sub-particle layers 50e, 50f, 50g and 50h, the columnar particle as shown in FIG. 5 is formed.

A columnar particle 60 of FIG. 6 includes a plurality of first sub-particle layers 61 and a plurality of second sub-particle layers 62.

Each sub-particle layer of the columnar particle of FIG. 6 has a thickness smaller than that of each sub-particle layer of the columnar particle of FIG. 5. The columnar particle of FIG. 6 has a smoother contour than that of the columnar particle of FIG. 5.

In the columnar particle of FIG. 6 also, as long as the average growth direction of the columnar particle as a whole is aligned parallel to the normal line direction of the current collector surface, the growth directions of the sub-particle layers may be inclined from the normal line direction of the current collector surface. In the columnar particle of FIG. 6, the growth direction of the first sub-particle layers 61 is the direction indicated by A, and the growth direction of the second sub-particle layers 62 is the direction indicated by B.

Figure 7:
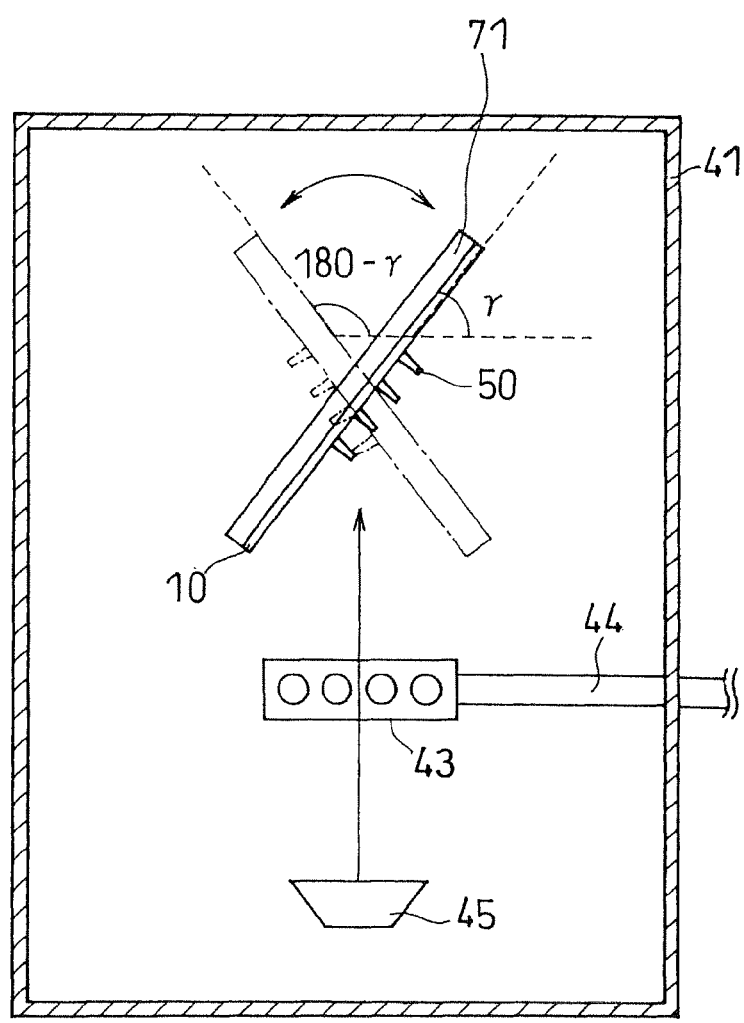
FIG. 7 is a schematic diagram showing another example of a production apparatus used to form active material layers.

The active material layer including columnar particles as shown in FIG. 5 can be produced using, for example, a vapor deposition apparatus 70 as shown in FIG. 7. FIG. 7 is a side view schematically showing a configuration of the vapor deposition apparatus 70. In FIG. 7, the same reference numbers are given to the same components as in FIG. 4, and a description thereof is omitted.

A holding table 71, which is a plate member, is supported in an angle changeable or rotatable manner in a chamber 41, and a current collector 10 is fixed onto one surface of the table in the thickness direction. The angle of the table 71 is changed between the position indicated by the solid line and the position indicated by the dash dotted line in FIG. 7. The position indicated by the solid line is a position (Position A) at which the surface of the holding table 71 on which the current collector 10 is fixed faces a target 45 located vertically below the table, and the angle between the holding table 71 and a line in the horizontal direction is $\gamma°$. The position indicated by the dash dotted line is a position (Position B) at which the surface of the holding table 71 on which the current collector 10 is fixed faces the target 45 located vertically below the table, and the angle between the holding table 71 and the line in the horizontal direction is $(180-\gamma)°$. The angle $\gamma°$ can be selected appropriately according to the dimension of the active material layer to be formed, or the like.

According to the method for producing the active material layer using the vapor deposition apparatus 70, the current collector 10 is first fixed onto the holding table 71, and an oxygen gas is introduced into the chamber 41. In this condition, electron beams are irradiated to the target 45 to heat the target, generating vapor from the target. For example, when silicon is used as the target, the vaporized silicon passes through the oxygen atmosphere, and a silicon oxide is deposited onto the surface of the current collector. In this process, by arranging the holding table 71 to the position indicated by the solid line, the sub-particle layer 50a as shown in FIG. 5 is formed on the protrusions. Subsequently, by arranging the holding table 71 to the position indicated by the dash dotted line by changing the angle, the sub-particle layer 50b as shown in FIG. 5 is formed. By arranging the holding table 71 alternately to Positions A and B as just described, the columnar particles 50 each having eight sub-particle layers as shown in FIG. 5 are formed.

The columnar particle 60 shown in FIG. 6 also can be produced basically in the same manner as the columnar particle of FIG. 5 using the vapor deposition apparatus of FIG. 7. The columnar particle 60 of FIG. 6 can be produced by, for example, using a shorter vapor deposition time for each of Positions A and B than that used for forming the columnar particle of FIG. 5, and increasing the number of sub-particle layers to be laminated than that of the columnar particle of FIG. 5.

With either of the above production methods, the columnar particles can be formed at a predetermined spacing by arranging protrusions regularly on the current collector surface and forming an active material layer including a plurality of columnar particles containing silicon on the current collector.

When the active material layer is formed only on one surface of the current collector, the protrusions may be formed only on the surface of the substrate on which the active material layer is to be formed. It is also possible to form the active material layer on both surfaces of the current collector that has protrusions formed on both surfaces.

Besides the method described above, the active material layer containing a silicon oxide can be produced also by using a silicon oxide as a target, and allowing the silicon oxide to deposit onto the current collector without the presence of an oxygen atmosphere between the current collector and the target. It is also possible to allow a silicon nitride to deposit onto the current collector by using a nitrogen atmosphere instead of the oxygen atmosphere and a silicon simple substance as the target.

Further, active material particles made of silicon simple substance or active material particles made of a silicon alloy can be produced by using a silicon simple substance or a material (including a mixture) containing elements that form a silicon alloy as the target, and vaporizing the target in a vacuum in the above-described vapor deposition apparatus.

Incidentally, the negative electrode current collector included in a battery can be observed by removing the negative electrode active material layer from the negative electrode current collector. For example, a lithium ion secondary battery in a charged state is disassembled to remove the negative electrode. Upon immersing the negative electrode in water, the lithium present in the negative electrode reacts rapidly with water, and the negative electrode active material detaches easily from the current collector. In other words, by immersing the negative electrode in a charged state in water, the active material can be removed easily from the current collector.

Figure 8:
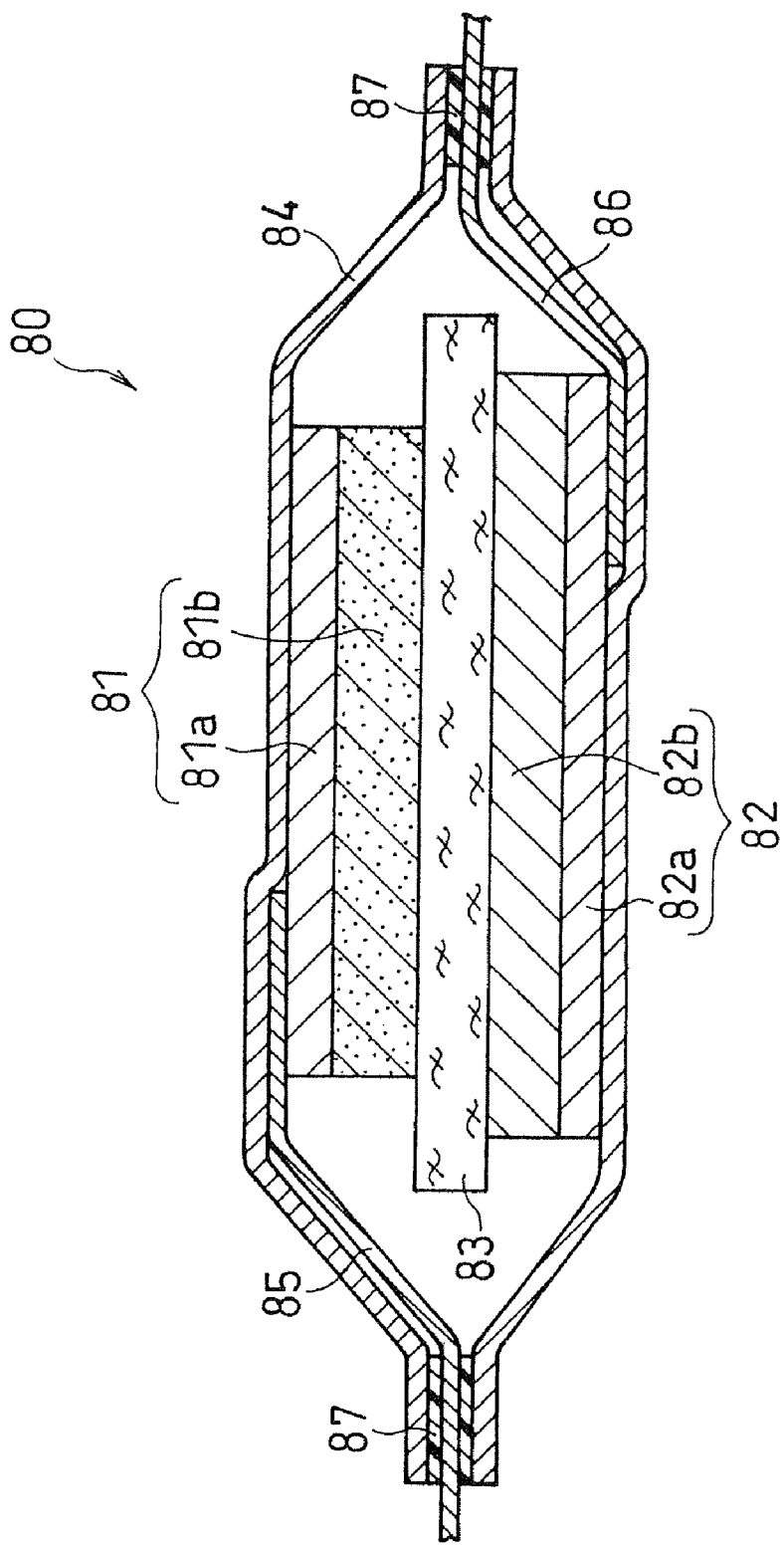
FIG. 8 is a vertical cross-sectional view schematically showing a lithium secondary battery according to an embodiment of the present invention.

The electrode plate 1 as described above preferably is used as a negative electrode for a lithium secondary battery including a negative electrode active material containing silicon. FIG. 8 shows a lithium secondary battery according to an embodiment of the present invention.

A battery 80 of FIG. 8 includes a laminated electrode assembly and an electrolyte (not shown) housed in a battery case 84. The electrode assembly includes a positive electrode 81, a negative electrode 82 and a separator 83 disposed between the positive electrode 81 and the negative electrode 82. The negative electrode 82 includes, as described above, a current collector 82a having a substrate and protrusions carried on the substrate, and a negative electrode active material layer 82b. The negative electrode active material layer 82b includes, for example, a plurality of columnar negative electrode active material particles carried on the protrusions. In the battery of FIG. 8, the negative electrode active material layer is formed only on one surface of the negative electrode current collector.

The positive electrode 81 includes a positive electrode current collector 81a and a positive electrode active material layer 81b carried on one surface of the current collector.

One end of a negative electrode lead 86 is connected to the surface of the negative electrode current collector 82a on which no negative electrode active material layer is formed. One end of a positive electrode lead 85 is connected to the surface of the positive electrode current collector 81a on which no positive electrode active material layer is formed.

The battery case 84 has openings that are located in opposite directions from each other. The other end of the positive electrode lead 85 is drawn to the outside through one opening of the battery case 84, and the other end of the negative electrode lead 86 is drawn to the outside through the other opening of the battery case 84. The openings of the battery case 84 are hermetically sealed with a sealant 87.

As the material for the positive electrode current collector, any material known in the pertinent art can be used. An example of such a material is aluminum.

The positive electrode active material layer can include, for example, a positive electrode active material, a binder and a conductive material. As the positive electrode active material, and the binder to be added to the positive electrode, any materials known in the pertinent art can be used. As the positive electrode active material, for example, a lithium-containing composite oxide such as lithium cobalt oxide can be used.

As the binder to be added to the positive electrode, for example, polytetrafluoroethylene or polyvinylidene fluoride can be used.

Examples of the conductive material to be added to the positive electrode include: graphites such as natural graphite (flake graphite and the like), artificial graphite and expanded graphite; carbon blacks such as acetylene black, ketjen black, channel black, furnace black, lamp black and thermal black; conductive fibers such as carbon fiber and metal fiber; metal powders such as copper powder and nickel powder; and organic conductive materials such as polyphenylene derivative. The above materials may be used alone or in a combination of two or more.

The electrolyte includes a non-aqueous solvent and a solute dissolved in the non-aqueous solvent. Examples of the non-aqueous solvent include, but are not limited to, ethylene carbonate, propylene carbonate, dimethyl carbonate, diethyl carbonate and ethyl methyl carbonate. These non-aqueous solvents may be used alone or in combination of two or more.

Examples of the solute include $LiPF_6$, $LiBF_4$, $LiCl_4$, $LiAlCl_4$, $LiSbF_6$, $LiSCN$, $LiCl$, $LiCF_3SO_3$, $LiCF_3CO_2$, $Li(CF_2SO_2)_2$, $LiAsF_6$, $LiN(CF_3SO_2)_2$, $LiB_{10}Cl_{10}$, and imides. The above solutes may be used alone or in a combination of two or more.

As the material for the separator, any material known in the pertinent art can be used. Examples of the material include polyethylene, polypropylene, a mixture of polyethylene and polypropylene, and a copolymer of ethylene and propylene.

The shape of a lithium ion secondary battery including the above-described negative electrode may be, but is not limited to, for example, a coin type, sheet type or prismatic. The lithium ion secondary battery may be a large battery for use in electric vehicles and the like. The electrode assembly included in the lithium ion secondary battery of the present invention may be a laminated type or spirally-wound type.

EXAMPLES

Example 1

A laminated lithium secondary battery as shown in FIG. 8 was produced.

(i) Production of Positive Electrode

A positive electrode material mixture paste was prepared by sufficiently mixing 10 g of a lithium cobalt oxide ($LiCoO_2$) powder having an average particle size of about 10 μm serving as a positive electrode active material, 0.3 g of acetylene black serving as a conductive material, 0.8 g of a polyvinylidene fluoride powder serving as a binder, and an appropriate amount of N-methyl-2-pyrrolidone (NMP). The obtained paste was applied onto one surface of a 20 μm thick positive electrode current collector made of an aluminum foil, followed by drying and rolling to form a positive electrode active material layer.

Then, the obtained electrode plate was cut into a predetermined shape to obtain a positive electrode. In the obtained positive electrode, the positive electrode active material layer carried on one surface of the positive electrode current collector had a thickness of 70 μm and a size of 30 mm×30 mm.

A positive electrode lead made of aluminum was connected to the surface of the current collector having no positive electrode active material layer.

(ii) Production of negative electrode

A copper alloy foil (available from Hitachi Cable, Ltd.) (thickness: 18 μm) containing 96.45 wt % of copper, 2.5 wt % of nickel, and 0.5 wt % of silicon was used as a substrate. Protrusions formed of copper were formed on the substrate by a plating method.

A 25 μm thick dry film resist (available from Hitachi Chemical Co., Ltd.) was attached onto one surface of the copper alloy foil.

Circular dots having a diameter of 10 μm were printed onto a resin mask with a spacing between the centers of the dots of 20 μm. The resin mask was placed on the dry film resist. Using a parallel exposure system, i rays (ultraviolet rays having a wavelength of about 365 nm) were irradiated from above the resin mask so as to expose the resist to light. Then, development using an aqueous alkaline solution was performed to form a resist layer having openings arranged in a predetermined pattern.

Subsequently, the copper alloy foil including the resist layer having openings was immersed as a cathode in an electrolyte containing 270 g/L of copper (II) sulfate pentahydrate and 100 g/L of sulfuric acid. Under conditions of a current density of 5 A/dm$^2$ and an electrolyte temperature of 50° C., a copper layer having a thickness of 8 μm was formed on the copper alloy foil.

Thereafter, the resist layer was removed to form protrusions formed of copper that were arranged regularly on the copper alloy foil. From the difference between the analytical results by inductively coupled plasma (ICP) emission spectroscopy for the copper alloy foil and the copper alloy foil having protrusions, the formed protrusions were found to have a copper purity of 99.9 wt %. It was also found that the impurities contained in the protrusions were mainly oxygen and organic resist residues.

The protrusions had a height of 8 μm, a size of 10 μm, and a spacing between adjacent protrusions of 20 μm. The protrusions were formed only on one surface of the copper alloy foil.

The hardness of the surface of the copper alloy foil was measured using a Vickers hardness tester. As a result, the copper alloy foil as a substrate had a Vickers hardness of 250. The Vickers hardness of the protrusions was measured as follows. The entire surface of the copper alloy foil was plated with copper without forming the resist layer. The Vickers hardness of the formed copper layer was measured. As a result, the copper layer had a Vickers hardness of 120. This Vickers hardness of the copper layer was denoted as the Vickers hardness of the protrusions formed of copper.

Subsequently, a negative electrode active material layer was produced using a vapor deposition apparatus (available from ULVAC, Inc.) including an electron beam heater (not shown) as shown in FIG. 4.

The nozzles that were provided in the vapor deposition apparatus injected an oxygen gas having a purity of 99.7% (available from Nippon Sanso Corporation) at a flow rate of 80 sccm. As a target, a silicon simple substance having a purity of 99.9999% (available from Kojundo Chemical Lab. Co., Ltd.) was used.

The current collector obtained in the above-described manner was cut into a size of 40 mm×40 mm, and the cut-out current collector was fixed onto the holding table. The angle a between the holding table and the horizontal plane was set to 60°. The current collector had a thickness of 35 μm.

The accelerating voltage of electron beams irradiated to the target was set to −8 kV, and the emission current was set to 500 mA. The vapor of silicon simple substance passed through the oxygen atmosphere, and then deposited onto the current collector fixed onto the holding table. The vapor deposition time was set to 22 minutes. In this manner, a negative electrode plate having an active material layer on the current collector was obtained, the active material layer including columnar silicon oxide particles whose growth direction was inclined relative to the normal line direction of the surface of the current collector. In the obtained negative electrode plate, the active material layer was formed only on one surface of the current collector. The thickness T of the active material layer was 17 μm.

The amount of oxygen contained in the negative electrode active material was quantified by a combustion method. As a result, the composition of the negative electrode active material containing silicon and oxygen was $SiO_{0.5}$.

The porosity of the negative electrode active material layer was determined as follows. In the obtained negative electrode plate, the area S of the region in which the negative electrode active material layer was formed was 961 mm$^2$ (31 mm×31 mm).

The weight W of the active material layer was determined by subtracting the weight of the negative electrode current collector from the weight of the obtained negative electrode plate. From the weight W of the active material layer and the density D of $SiO_{0.5}$ (2.3 g/cm$^3$), the volume (W/D) of the active material layer was determined. The total space volume of the active material layer (S×T) was determined from the thickness T (17 μm) of the active material layer and the area S (961 mm$^2$) of the region of the current collector carrying the active material layer. Using the obtained volume (W/D) of the active material layer and the total space volume (S×T) of the active material layer, the porosity P (=100[{ST−(W/D)}/ST]) of the active material layer was determined. As a result, the porosity of the active material layer was 40%.

In the above calculation, the average value of the true density of Si (2.33 g/cm$^3$) and the true density of SiO (2.24 g/cm$^3$) was denoted as the density of $SiO_{0.5}$.

Subsequently, using a resistance heating vapor deposition apparatus (available from ULVAC, Inc.), lithium metal was deposited onto the surface of the obtained negative electrode plate in the following manner.

The negative electrode plate and a tantalum boat were placed in the vapor deposition apparatus, and a predetermined amount of lithium metal was loaded to the boat. The boat was fixed so as to face the active material layer of the negative electrode plate.

The current value flowing through the boat was set to 50 A, and vapor deposition was performed for 10 minutes. In this manner, lithium was supplied to the negative electrode active material made of $SiO_{0.5}$ in an amount sufficient to compensate for the irreversible capacity produced during the initial charge/discharge. Thereafter, the negative electrode plate onto which metal lithium was deposited was cut into a size of 31 mm×31 mm. Thus, negative electrode 1A was obtained.

A negative electrode lead made of nickel was connected to the surface of the negative electrode current collector having no negative electrode active material layer.

(iii) Assembly of battery

A separator made of a 20 μm thick polyethylene microporous film (available from Asahi Kasei Corporation)

was disposed between the positive electrode and the negative electrode obtained in the manner described above to produce a laminated electrode assembly. In this process, the positive electrode and the negative electrode were arranged such that the positive electrode active material layer and the negative electrode active material layer faced each other with the separator interposed therebetween.

The obtained electrode assembly was inserted, together with an electrolyte, into a battery case made of an aluminum laminate sheet.

The electrolyte was prepared by dissolving $LiPF_6$ at a concentration of 1.0 mol/L in a mixed solvent of ethylene carbonate and ethyl methyl carbonate mixed at a volume ratio of 1:1.

After allowed to stand for a predetermined period of time, the electrolyte was impregnated into the positive electrode active material layer, the negative electrode active material layer and the separator. Thereafter, in the state in which the positive electrode lead and the negative electrode lead were respectively drawn to the outside from opposite openings of the battery case located in directions opposite to each other, both openings of the battery case were hermetically sealed using a sealant while reducing the pressure to a vacuum condition in the battery case. Thereby, a battery was produced. The obtained battery is referred to as battery 1A.

COMPARATIVE EXAMPLE 1

Protrusions were formed on the surface of the substrate by a machining process. In other words, the protrusions formed on the surface had the same composition as that of the copper alloy foil serving as the substrate, and the same Vickers hardness as that of the substrate.

Figure 9:
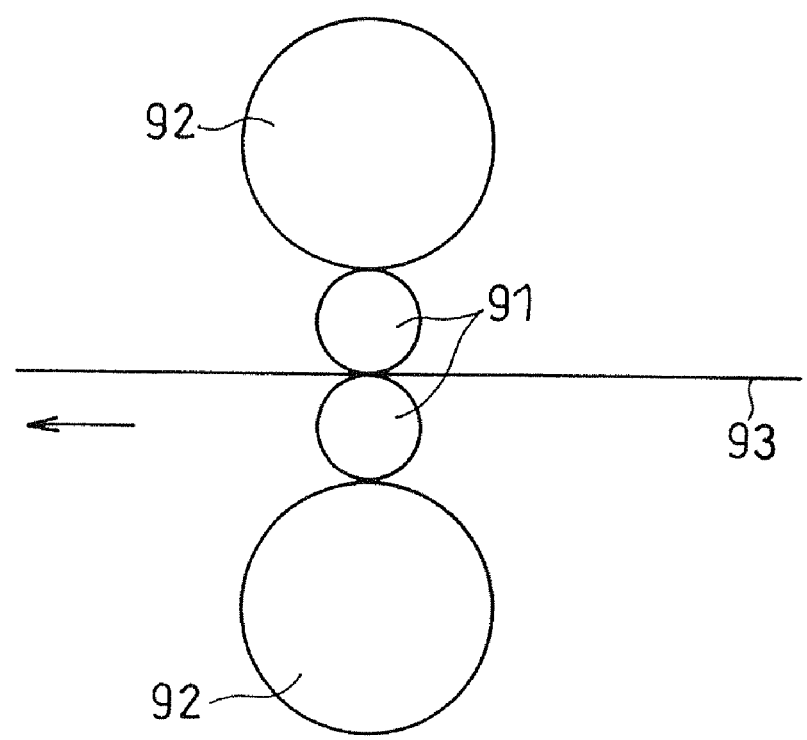
FIG. 9 is a schematic diagram of an apparatus for forming protrusions on a current collector used in Comparative Examples and Reference Examples.

A current collector was produced using an apparatus shown in FIG. 9 including processing rollers 91 for forming irregularities, and backup rollers 92 for supporting the processing rollers 91. As the processing rollers 91 for forming irregularities, iron rollers having a chromium oxide layer with regularly formed pores were used. The chromium oxide layer was formed by thermal-spraying chromium oxide onto iron rollers. The pores were formed by laser processing. The diameter of the pores was set to 10 μm and the depth of the pores was set to 11 μm. The distance between the centers of adjacent pores was set to 20 μm.

The substrate (copper alloy foil) 93 used in Example 1 was placed between the processing rollers 91, and protrusions were formed on both surfaces of the copper alloy foil with a linear pressure of 3 t/cm. The size of the formed protrusions was 9 μm. The obtained current collector was cut, and the cut surface was observed with an electron microscope. As a result, the protrusions had a height of 3 μm. The substrate and the protrusions had a Vickers hardness of 250.

Comparative negative electrode 1B was produced in the same manner as in Example 1, except that the obtained current collector was used. Comparative battery 1B was produced in the same manner as in Example 1, except that comparative negative electrode 1B was used.

COMPARATIVE EXAMPLE 2

A copper alloy foil (available from Hitachi Cable, Ltd.) containing 0.03 wt % of zirconia (Zr) was used as a substrate, and protrusions were formed on the surface of this substrate by the machining process.

Similarly to Comparative Example 1, the copper alloy foil containing 0.03 wt % of zirconia was placed between the processing rollers, and then press-molded with a linear pressure of 3 t/cm. Thus, a current collector having protrusions on both surfaces was obtained. Comparative negative electrode 1C was produced in the same manner as in Example 1, except that the obtained current collector was used. The size of the formed protrusions was 9 μm. The protrusions had a height of 4 μm. The substrate and the protrusions had a Vickers hardness of 150.

Comparative battery 1C was produced in the same manner as in Example 1, except that comparative negative electrode 1C was used.

COMPARATIVE EXAMPLE 3

A tough pitch copper foil (available from Hitachi Cable, Ltd.) was used as a substrate, and protrusions were formed on the surface of this substrate by the machining process.

Similarly to Comparative Example 1, the tough pitch copper foil was placed between the processing rollers, and then press-molded with a linear pressure of 2 t/cm. Thus, a current collector having protrusions on both surfaces was obtained. Comparative negative electrode 1D was produced in the same manner as in Example 1, except that the obtained current collector was used. The size of the formed protrusions was 9 μm. The protrusions had a height of 6 μm. The substrate and the protrusions had a Vickers hardness of 120.

Comparative battery 1D was produced in the same manner as in Example 1, except that comparative negative electrode 1D was used.

In Example 1, the negative electrode current collector was heated to 300° C. for the formation of the negative electrode active material. At such a temperature, only the protrusions formed of copper having a purity of 99.9 wt % were annealed, reducing the Vickers hardness of the protrusions. For this reason, the Vickers hardness of the annealed protrusions was measured. However, because Vickers hardness cannot be measured for the substrate and the protrusions after the formation of the active material, only the negative electrode current collector was heated at 300° C. for 22 minutes, after which the Vickers hardness of the protrusions was measured.

Similarly, the negative electrode current collectors of Comparative Examples 1 to 3 were heated at 300° C. for 22 minutes, after which the Vickers hardness of the protrusions was measured. In the case of the tough pitch copper having a high copper concentration, both the protrusions and the substrate were annealed by the above-described heat treatment. In other words, in comparative electrode 1D which used tough pitch copper, the annealed protrusions and the substrate had the same Vickers hardness.

The compositions of the negative electrode current collectors of negative electrode 1A, and comparative negative electrodes 1B to 1D are shown in Table 1.

TABLE 1

| | Substrate | Protrusions | Method for forming protrusions | Vickers hardness of substrate | Vickers hardness of protrusions | Vickers hardness of annealed protrusions | Height of protrusions (μm) | Porosity of active material layer (%) |
|---|---|---|---|---|---|---|---|---|
| Negative electrode 1A | Copper alloy foil | Copper | Plating | 250 | 120 | 80 | 8 | 40 |
| Comp. negative electrode 1B | Copper alloy foil | Same as substrate | Machining process | 250 | 250 | 250 | 3 | 20 |
| Comp. negative electrode 1C | Copper alloy foil | Same as substrate | Machining process | 150 | 150 | 150 | 4 | 25 |
| Comp. negative electrode 1D | Tough pitch copper foil | Same as substrate | Machining process | 120 | 120 | 70 | 6 | 30 |

[Evaluation Method]

(i) Cycle Characteristics

First, battery 1A and comparative batteries 1B to 1D each were housed in a thermostatic chamber held at 20° C., and then charged by the following constant current constant voltage method. Each battery was charged at a constant current of 1 C rate (1 C is a current value at which the entire battery capacity can be consumed in one hour) until the battery voltage reached 4.2 V. After the battery voltage reached 4.2 V, each battery was charged at a constant voltage of 4.2 V until the current value reached 0.05 C.

The charged battery was then allowed to stand for 20 minutes, after which the battery was discharged at a constant current as high as 1 C rate until the battery voltage reached 2.5 V.

The charge/discharge cycle as described above was repeated 100 times.

The ratio of the total discharge capacity at the 100th cycle to the total discharge capacity at the first cycle was denoted as capacity retention ratio. The results are shown in Table 2. In Table 2, the capacity retention ratio is expressed in a percentage value.

For all the batteries, lithium was deposited on the negative electrode so as to supply lithium in an amount sufficient to compensate for the irreversible capacity. Accordingly, the capacity of each battery is restricted by the capacity of the positive electrode. Specifically, if the battery voltage is 2.5 V, which is the end-of-charge voltage, the potential of the positive electrode relative to lithium is 3 V, and the potential of the negative electrode is 0.5 V. The discharge is terminated when the potential of the positive electrode starts decreasing.

TABLE 2

| | Capacity retention ratio (%) | Condition of negative electrode after 100 cycles |
|---|---|---|
| Battery 1A | 90 | No crease occurred |
| Comp. battery 1B | 50 | Detachment of active material layer occurred |
| Comp. battery 1C | 55 | Detachment of active material layer occurred |
| Comp. battery 1D | 60 | Creases occurred |

In battery 1A, no crease occurred in the electrode plate even after 100 cycles, and the battery exhibited a very high value in capacity retention ratio. In the negative electrode current collector included in battery 1A, the protrusions formed on the current collector surface were formed with a material that easily undergoes plastic deformation and without the machining process. For this reason, the protrusions of battery 1A was able to follow the expansion of the active material. Presumably, this prevented the active material from being detached from the current collector. Further, it was more difficult for the substrate to undergo plastic deformation than the protrusion, so the substrate had hardness such that the substrate does not follow the expansion of the active material. For this reason, the occurrence of crease in the electrode plate was suppressed. Accordingly, excellent cycle characteristics were obtained for battery 1A.

On the other hand, comparative batteries 1B to 1C exhibited lower cycle characteristics than battery 1A. Also, the active material was detached at the interface between the active material and the protrusions. This is presumably because the protrusions had hardness such that the protrusions could not follow the expansion of the active material.

For comparative battery 1D, the protrusions were formed of a material such that the protrusions could follow the expansion of the active material. However, the substrate also was formed of the same material as the protrusions, so the stress caused by the expansion and contraction was transmitted to the substrate, causing creases in the electrode plate. As a result, the reactivity of the electrode plate was nonuniform, so the charge/discharge was nonuniform, which resulted in poor cycle characteristics.

Example 2

Negative electrodes 2A to 2F as described below were produced in the same manner as in Example 1, except that the method for forming the protrusions was changed. Batteries 2A to 2F were produced in the same manner as in Example 1, except that negative electrodes 2A to 2F were used.

(i) Negative Electrode 2A

Protrusions were formed by a vapor deposition method.

A resist layer having openings arranged in a predetermined pattern was formed on the surface of the copper alloy foil used in Example 1 in the same manner as in Example 1. Thereafter, copper was deposited. The deposition of copper was performed using a vapor deposition apparatus 40 (available from ULVAC, Inc.) including an electron beam (EB) heater as shown in FIG. 4.

The copper alloy foil including the resist layer having openings was fixed onto the holding table 42. A copper simple substance having a purity of 99.9% (available from Kojundo Chemical Lab. Co., Ltd.) was disposed as a target vertically below the holding table. The holding table was fixed to be horizontal. The accelerating voltage of electron beams irradiated to the copper target was set to −8 kV, and the emission current was set to 100 mA.

The vapor of the copper simple substance was deposited onto the copper alloy foil disposed on the holding table 52 to form a copper layer. The vapor deposition time was set to 20 minutes. The copper layer had a thickness of 8 μm. The resist layer on the substrate was removed with an aqueous alkaline solution to form protrusions regularly arranged on the substrate.

The protrusions had a height of 8 μm. The protrusions had a size of 10 μm. The spacing between adjacent protrusions was 20 μm.

Negative electrode 2A was produced in the same manner as in Example 1, except that this current collector was used.

The Vickers hardness of the protrusions produced by depositing copper was determined by measuring the hardness of a deposited copper film, which was obtained by depositing copper on the entire surface of the copper alloy foil without forming the resist layer, with a Vickers hardness tester. As a result, the protrusions had a Vickers hardness of 160.

The formed protrusions had a copper purity of 99.9 wt %.

(ii) Negative Electrode 2B

Irregularly arranged protrusions were formed by plating the surface of the copper alloy foil used in Example 1 with copper in the form of bumps in the manner described below.

The copper alloy foil as cathode was immersed in an electrolyte containing 47 g/L of copper (II) sulfate pentahydrate and 100 g/L of sulfuric acid, and was plated under conditions of a current density of 30 A/dm² and an electrolyte temperature of 50° C. to form protrusions that were in the form of bumps and formed of copper. Further, a copper coating was applied on this electrodeposited copper product by plating using an electrolyte containing 235 g/L of copper (II) sulfate pentahydrate and 100 g/L of sulfuric acid under conditions of an electrolyte temperature of 50° C. and a current density of 3 A/dm², so as to improve the adhesion of the bump-shaped protrusions to the copper alloy foil. The protrusions formed by plating had irregular heights ranging from 1 to 41 μm. The protrusions had a size of 1 μm, and the shape of the protrusions was nearly spherical. The spacing between adjacent protrusions was 6 μm.

Negative electrode 2B was produced in the same manner as in Example 1, except that this current collector was used.

The Vickers hardness of the bump-shaped protrusions was determined by measuring the hardness of a copper-plated layer, which was formed by plating the surface of the copper alloy foil uniformly with copper under the same conditions as above, with a Vickers hardness tester. As a result, the protrusions were found to have a Vickers hardness of 120.

The formed protrusions had a copper purity of 99.9 wt %.

(iii) Negative Electrode 2C

Protrusions were formed by a sintering method.

A slurry was prepared by dispersing copper particles having an average particle size of 8 μm in N-methyl-2-pyrrolidone (NMP). The copper particles accounted for 50 wt % in the obtained slurry. The copper particles had a purity of 99.9 wt %.

The obtained slurry was applied thinly on the surface of the copper alloy foil used in Example 1. Thereafter, the copper alloy foil to which the slurry was applied was subjected to a heat treatment at 120° C. to volatilize NMP.

Subsequently, the copper alloy foil was subjected to a heat treatment at 600° C. in a nitrogen gas flow to sinter the copper particles and the copper alloy foil. Thus, a current collector in which the copper particles were bonded to form protrusions on the surface of the copper alloy foil was obtained. The protrusions had a height of 7 μm. The protrusions had a size of 8 μm. The spacing between adjacent protrusions was 13 μm.

The Vickers hardness of the protrusions was determined by measuring the Vickers hardness of a sintered film obtained by sintering the copper particles into a 5 mm thick film. As a result, the protrusions were found to have a Vickers hardness of 130.

The formed protrusions had a copper purity of 99.9 wt %.

Negative electrode 2C was produced in the same manner as in Example 1, except that this current collector was used.

(iv) Negative Electrode 2D

Negative electrode 2D was produced in the same manner as negative electrode 2C was produced, except that copper particles having an average particle size of 0.5 μm (purity: 99.9 wt %) were used. The protrusions had a height of 0.5 μm. The protrusions had a size of 0.5 μm. The spacing between adjacent protrusions was 1 μm.

The Vickers hardness of the protrusions was determined by measuring the Vickers hardness of a sintered film obtained by sintering the copper particles into a 5 mm thick film. As a result, the protrusions were found to have a Vickers hardness of 130.

The formed protrusions had a copper purity of 99.9 wt %.

Negative electrode 2D was produced in the same manner as in Example 1, except that this current collector was used.

(v) Negative Electrode 2E

Negative electrode 2E was produced in the same manner as in Example 1, except that the height of the protrusions was changed to 15 μm. The protrusion size and the spacing between adjacent protrusions were the same as for negative electrode 1A.

(vi) Negative Electrode 2F

Negative electrode 2F was produced in the same manner as in Example 1, except that the height of the protrusions was changed to 20 μm. The protrusion size and the spacing between adjacent protrusions were the same as for negative electrode 1A.

The protrusions of negative electrodes 2A to 2F were formed of copper having a purity of 99.9 wt %. In these negative electrodes also, similarly to Example 1, the protrusions were annealed for the formation of the negative electrode active material layer, so the Vickers hardness of the protrusions were reduced. Accordingly, similarly to Example 1, the Vickers hardness of the protrusions after annealing was measured.

The compositions of negative electrodes 2A to 2F are shown in Table 3.

TABLE 3

| | Substrate | Component material for protrusions (Forming method) | Vickers hardness of substrate | Vickers hardness of protrusions | Vickers hardness of annealed protrusions | Height of protrusions (μm) | Porosity of active material layer (%) |
|---|---|---|---|---|---|---|---|
| Negative electrode 2A | Copper alloy foil | Copper (Vapor deposition) | 250 | 160 | 100 | 8 | 40 |
| Negative electrode 2B | Copper alloy foil | Copper (Copper layer having bumps formed by plating) | 250 | 120 | 80 | 1 | 20 |
| Negative electrode 2C | Copper alloy foil | Copper (Sintering) | 250 | 130 | 70 | 7 | 30 |
| Negative electrode 2D | Copper alloy foil | Copper (Sintering) | 250 | 120 | 70 | 0.5 | 5 |
| Negative electrode 2E | Copper alloy foil | Copper (Plating) | 250 | 120 | 80 | 15 | 40 |
| Negative electrode 2F | Copper alloy foil | Copper (Plating) | 250 | 120 | 80 | 20 | 40 |

Capacity retention ratio was determined for Batteries 2A to 2F in the same manner as described above. The results are shown in Table 4.

TABLE 4

| | Capacity retention ratio (%) |
|---|---|
| Battery 2A | 85 |
| Battery 2B | 80 |
| Battery 2C | 83 |
| Battery 2D | 70 |
| Battery 2E | 90 |
| Battery 2F | 88 |

The result of battery 2A indicates that excellent cycle characteristic are obtained when the protrusions after the formation of the active material layer (i.e., after annealing) have a Vickers hardness of not greater than 90.

The results of Batteries 2B to 2D indicate that effective methods for producing the protrusions are a method in which the surface of the substrate is plated with copper to form bump-shaped protrusions, and a method in which the copper particles are sintered.

The results also indicate that the height of the protrusions preferably is not less than 1 μm. Thereby, it is possible to sufficiently relieve the stress generated when the active material expands while insuring an appropriate porosity in the active material layer.

The results of Batteries 2E to 2F indicate that excellent cycle characteristics are obtained also when the protrusions have a height of 20 μm. However, when the protrusions have a height of not less than 15 μm, the porosity of the active material layer remains the same, and the cycle characteristics remain similar.

On the other hand, when the protrusions having a height of 20 μm are formed on both surfaces of the current collector, the total thickness of only the protrusions will be 40 μm. The ratio of the space that does not contribute to the battery capacity increases as the thickness of the protrusions increases, so a high capacity battery cannot be designed.

From the above results, it can be concluded that the protrusions preferably have a height of not less than 1 μm and not greater than 15 μm.

Example 3

Negative electrodes 3A to 3D as described below were produced in the same manner as in Example 1, except that the type of substrate was changed. Then, Batteries 3A to 3D were produced in the same manner as in Example 1, except that negative electrodes 3A to 3D were used.

(i) Negative Electrode 3A

Negative electrode 3A was produced in the same manner as in Example 1, except that a nickel foil was used as a substrate. The nickel foil used had a Vickers hardness of 300.

The protrusions had a height of 8 μm, a size of 10 μm, and a spacing between adjacent protrusions of 20 μm.

(ii) Negative Electrode 3B

Negative electrode 3B was produced in the same manner as in Example 1, except that a stainless steel foil was used as a substrate. The stainless steel foil used had a Vickers hardness of 200.

The protrusions had a height of 8 μm, a size of 10 μm, and a spacing between adjacent protrusions of 20 μm.

(iii) Negative Electrode 3C

Negative electrode 3C was produced in the same manner as in Example 1, except that a copper alloy foil containing 0.5 wt % of tin (Sn) was used as a substrate. The copper alloy foil had a Vickers hardness of 140.

The protrusions had a height of 8 μm, a size of 10 μm, and a spacing between adjacent protrusions of 20 μm.

(iv) Negative Electrode 3D

Negative electrode 3D was produced in the same manner as in Example 1, except that a copper alloy foil containing 0.03 wt % of zirconia (Zr) was used as a substrate. The copper alloy foil had a Vickers hardness of 150.

The protrusions had a height of 8 μm, a size of 10 μm, and a spacing between adjacent protrusions of 20 μm.

Negative electrodes 3A to 3D had the same protrusions as in Example 1. For these negative electrodes, the Vickers hardness of the protrusions after annealing was measured in the same manner as in Example 1.

The compositions of negative electrodes 3A to 3D are shown in Table 5.

TABLE 5

| | Substrate | Component material for protrusions (Forming method) | Vickers hardness of substrate | Vickers hardness of protrusions | Vickers hardness of annealed protrusions | Height of protrusions (μm) | Porosity of active material layer (%) |
|---|---|---|---|---|---|---|---|
| Negative electrode 3A | Ni foil | Copper (Plating) | 300 | 120 | 80 | 8 | 38 |
| Negative electrode 3B | Stainless steel foil | Copper (Plating) | 200 | 120 | 80 | 8 | 40 |
| Negative electrode 3C | Copper alloy foil (containing 0.5 wt % of Sn) | Copper (Plating) | 140 | 120 | 80 | 8 | 40 |
| Negative electrode 3D | Copper alloy foil (containing 0.03 wt % of Zr) | Copper (Plating) | 150 | 120 | 80 | 8 | 41 |

Capacity retention ratio was determined for Batteries 3A to 3D in the same manner as described above. The results are shown in Table 6.

TABLE 6

| | Capacity retention ratio (%) |
|---|---|
| Battery 3A | 90 |
| Battery 3B | 89 |
| Battery 3C | 89 |
| Battery 3D | 90 |

Even when the substrate was a nickel foil, stainless steel foil, tin copper alloy foil or zirconia copper alloy foil, no crease was formed in the electrode plate after 100 cycles of charge and discharge. This is presumably because the stress generated by the expansion and contraction of the active material was absorbed by the protrusions, so the stress was not transmitted to the substrate. Also, from the results of Table 6, it was found that excellent characteristics are obtained with any of the substrates.

Example 4

Negative electrodes 4A to 4C were produced using, as negative electrode active materials, silicon alloys and a silicon compound produced in the following manner. Then, Batteries 4A to 4C were produced in the same manner as in Example 1, except that negative electrodes 4A to 4C were used. As metal elements M contained in the silicon alloys other than silicon, Ti (negative electrode 4A) and Cu (negative electrode 4B) that do not form an alloy with lithium were used. The silicon compound (negative electrode 4C) included nitrogen as an element other than silicon.

(i) Negative Electrode 4A

To form a negative electrode active material layer, as a target, a mixture of Si powder (available from Kojundo Chemical Lab. Co., Ltd.) and $TiSi_2$ powder (available from Kojundo Chemical Lab. Co., Ltd.) (Si:$TiSi_2$=3:1 (molar ratio)) was used. The angle α between the holding table and the horizontal plane was set to 600. The vapor deposition time was set to 25 minutes. The flow rate of oxygen gas was set to 0 sccm. Negative electrode 4A was produced in the same manner as in Example 1, except for the above procedure.

The elements contained in the obtained active material layer were quantified by X-ray fluorescence spectrometry. As a result, the composition of the formed silicon alloy was $SiTi_{0.2}$.

(ii) Negative Electrode 4B

To form a negative electrode active material layer, as a target, a mixture of Si powder (available from Kojundo Chemical Lab. Co., Ltd.) and Cu powder (available from Kojundo Chemical Lab. Co., Ltd.) (Si:Cu=5:1 (molar ratio)) was used. The angle α between the holding table and the horizontal plane was set to 60°. The vapor deposition time was set to 25 minutes. The flow rate of oxygen gas was set to 0 sccm. Negative electrode 4B was produced in the same manner as in Example 1, except for the above procedure.

The elements contained in the obtained active material layer were quantified by X-ray fluorescence spectrometry. As a result, the composition of the silicon alloy was $SiCu_{0.2}$.

(iii) Negative Electrode 4C

To form a negative electrode active material layer, as a target, monocrystalline silicon (available from Kojundo Chemical Lab. Co., Ltd.) was used. Instead of the oxygen gas, a nitrogen gas was introduced into the chamber. The accelerating voltage of electron beams irradiated to the target was set to −8 kV, and the emission current was set to 300 mA. The angle α between the holding table and the horizontal plane was set to 600. The vapor deposition time was set to 40 minutes. Negative electrode 4C was produced in the same manner as in Example 1, except for the above procedure.

As the nitrogen gas, a nitrogen gas having a purity of 99.7% (available from Nippon Sanso Corporation) was used, and the flow rate of the nitrogen gas was set to 20 sccm. An electron beam irradiating device was installed near the nozzles to convert the nitrogen gas to a plasma. For the electron beam irradiating device, the accelerating voltage was set to −4 kV, and the emission current was set to 20 mA.

The elements contained in the obtained active material layer were quantified by X-ray fluorescence spectrometry. As a result, the composition of the compound containing silicon and nitrogen was $SiN_{0.2}$.

In negative electrodes 4A to 4C, the protrusions had a height of 8 μm, a size of 10 μm, and a spacing between adjacent protrusions of 20 μm.

The negative electrode active material layers included in negative electrodes 4A to 4C had a porosity of 40%.

Capacity retention ratio was determined for Batteries 4A to 4C in the same manner as in Example 1. The results are shown in Table 7.

TABLE 7

| | Capacity retention ratio (%) |
|---|---|
| Battery 4A | 80 |
| Battery 4B | 81 |
| Battery 4C | 85 |

The result of battery 4A indicates that even when an alloy containing silicon and titanium is used as the active material, an excellent capacity retention ratio is obtained. The result of battery 4B indicates that even when an alloy containing silicon and copper is used as the active material, an excellent capacity retention ratio is obtained.

The result of battery 4C indicates that even when a compound containing silicon and nitrogen is used as the active material, an excellent capacity retention ratio is obtained.

Example 5

Negative electrodes 5A and 5B were produced in the same manner as in Example 1, except that the negative electrode active material layers were formed as follows. The active material layers were formed by depositing metal lithium in the same manner as in Example 1.

Batteries 5A and 5B were produced in the same manner as in Example 1, except that negative electrodes 5A and 5B were used.

(i) Negative Electrode 5A

Figure 10:
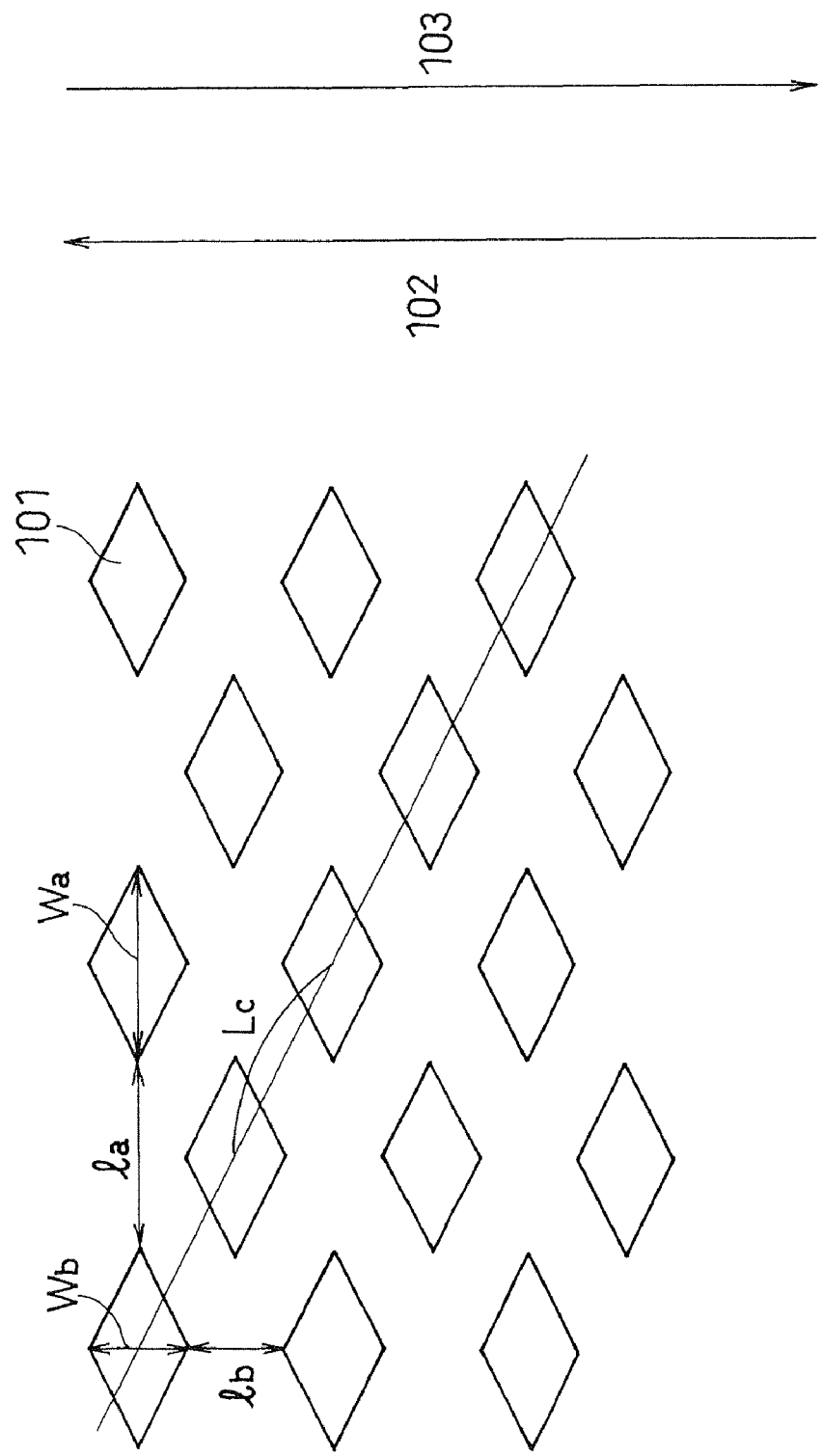
FIG. 10 is a top view schematically showing a current collector used in Example 5.

To form protrusions, a resin mask in which rhombic dots 101 were arranged in a checkered pattern as shown in FIG. 10 was used. The mask shown in FIG. 10 had rhombic dots each having a major axis $W_a$ of 20 μm and a minor axis $W_b$ of 10 μm. The distance $l_a$ between two rhombic dots that were adjacent in the direction of the major axis $W_a$ was set to 20 μm, and the distance $l_b$ between two rhombic dots that were adjacent in the direction of the minor axis $W_b$ was set to 18 μm. In other words, the spacing between protrusions that were adjacent in the major axis $W_a$ direction (the distance between the center axes) was 40 μm, and the spacing between protrusions that were adjacent in the minor axis $W_b$ direction (the distance between the center axes) was 28 μm. The spacing Lc between adjacent protrusions that were adjacent in an oblique direction (the distance between the center axes) was 24 μm.

Using this resin mask, a negative electrode current collector 5A having rhombic protrusions was produced in the same manner as in Example 1. The protrusions had a height of 6 μm.

Using the negative electrode current collector 5A, a negative electrode active material layer including columnar particles as shown in FIG. 5 was formed using a vapor deposition apparatus shown in FIG. 7. Each sub-particle layer was formed by oblique deposition.

More specifically, the negative electrode current collector was fixed onto the holding table 71. The holding table 71 was inclined to form an angle γ of 60° with respect to the horizontal plane (Position A).

The accelerating voltage of electron beams irradiated to a silicon simple substance serving as the target 45 was set to −8 kV, and the emission current was set to 500 mA. The flow rate of oxygen gas ejected the nozzles was set to 80 sccm. Silicon and oxygen were deposited onto the current collector held on the holding table 71 so as to form a first sub-particle layer 50a on the protrusions. The vapor deposition time was set to 2 minutes and 30 seconds. The growth direction of the first sub-particle layer 50a projected on the surface of the current collector was the direction indicated by arrow 102 (first direction).

Subsequently, the holding table 71 was inclined to form an angle of 120° (i.e., (180−γ)°) with respect to the horizontal plane as shown in FIG. 7 (Position B). Under the same conditions as in the case of the first sub-particle layer, a second sub-particle layer 50b was formed on the first sub-particle layer 50a. The growth direction of the second sub-particle layer 50b projected on the surface of the current collector was the direction indicated by arrow 103 (second direction).

By changing the position of the holding table alternately to Position A and Position B as described above, an active material layer formed of columnar particles each including a laminate of eight sub-particle layers as shown in FIG. 5 was formed.

The negative electrode active material layer had a thickness T of 16 μm. The amount of oxygen contained in the negative electrode active material layer was quantified by a combustion method. As a result, the composition of the negative electrode active material was $SiO_{0.5}$. The porosity of the negative electrode active material layer was determined in the same manner as in Example 1, and found to be 46%.

(ii) Negative Electrode 5B

Negative electrode 5B was obtained in the same manner as negative electrode 5A was obtained, except that a negative electrode active material layer including columnar particles each formed of a laminate of 35 sub-particle layers as shown in FIG. 6 was formed with the vapor deposition time for each sub-particle layer set to 38 seconds.

The negative electrode active material layer had a thickness T of 17 μm. The amount of oxygen contained in the negative electrode active material layer was quantified by a combustion method. As a result, the composition of the negative electrode active material was $SiO_{0.5}$. The porosity of the negative electrode active material layer was determined in the same manner as in Example 1, and found to be 48%.

It should be noted that the direction indicated by arrow 102 (first direction) and the direction indicated by arrow 103 (second direction) are opposite direction from each other.

Capacity retention ratio was determined for Batteries 5A and 5B in the same manner as in Example 1. Negative electrodes 5A and 5B were visually checked after being cycled 100 times. The results are shown in Table 8.

TABLE 8

| | Capacity retention ratio (%) | Condition of negative electrode after 100 cycles |
|---|---|---|
| Battery 5A | 92 | No crease occurred |
| Battery 5B | 93 | No crease occurred |

Even when the negative electrode active material layer included columnar particles each made up of a plurality of layers formed by oblique deposition, similarly to battery 1A of Example 1, the occurrence of crease was suppressed, and excellent cycle characteristics were obtained. This is presumably because a space was created around the columnar particles, and thus the expansion of the active material was absorbed into the space, and collision between adjacent columnar particles was avoided.

Further, an improvement was observed in the capacity retention ratio of batteries 5A and 5B as compared with that of battery 1A. In the case of the columnar particles produced in this example whose growth direction was parallel to the normal line direction of the current collector surface, the stress at the interface generated during the expansion of the active material was reduced as compared with the case of the columnar particles whose growth direction was inclined with respect to the normal line direction of the current collector surface. Presumably for this reason, although the thickness of the active material layer was large, the occurrence of crease in the current collector was suppressed, and capacity retention ratio was improved.

In the present invention, protrusions that easily undergo plastic deformation and easily follow the expansion of the active material are formed on the surface of the current collector. For this reason, according to the present invention, it is possible to provide a lithium secondary battery having a high capacity and excellent cycle characteristics. Such a lithium secondary battery can be used as, for example, a power source for portable electronic devices.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An electrode plate for a battery comprising:
   a current collector including a substrate and a plurality of protrusions that are carried on said substrate; and
   an active material layer that is carried on said current collector;
   wherein said substrate is a copper alloy foil containing at least one element selected from the group consisting of Ni, Si, Sn, Be, Co, Ti, Fe and Zr,
   said protrusions comprise a conductive material that undergoes plastic deformation more easily than said substrate, and
   said active material layer comprises columnar particles of a silicon-containing material in which said columnar particles are carried on said protrusions.

2. The electrode plate for a battery in accordance with claim 1, wherein said protrusions have a height of 1 to 15 .mu.m.

3. The electrode plate for a battery in accordance with claim 1, wherein said protrusions comprise copper having a purity of not less than 99.9 wt %.

4. The electrode plate for a battery in accordance with claim 1, wherein at least part of said columnar particles is inclined with respect to a normal line direction of the surface of said current collector.

5. The electrode plate for a battery in accordance with claim 4, wherein said columnar particles each is a laminate of a plurality of sub-particle layers.

6. The electrode plate for a battery in accordance with claim 5, wherein the growth directions of said plurality of sub-particle layers are inclined with respect to the normal line direction of the surface of said current collector.

7. The electrode plate for a battery in accordance with claim 6, wherein the growth directions of said plurality of sub-particle layers are inclined alternately in a first direction and a second direction with respect to the normal line direction of the surface of said current collector.

8. The electrode plate for a battery in accordance with claim 1, wherein said protrusions are formed by a plating method, vapor deposition method, sputtering method or sintering method.

9. A lithium secondary battery comprising a positive electrode capable of absorbing and desorbing lithium ions, the electrode plate in accordance with claim 1 serving as a negative electrode, a separator that is disposed between said positive electrode and said negative electrode, and an electrolyte having lithium ion conductivity.

* * * * *